UNITED STATES PATENT OFFICE.

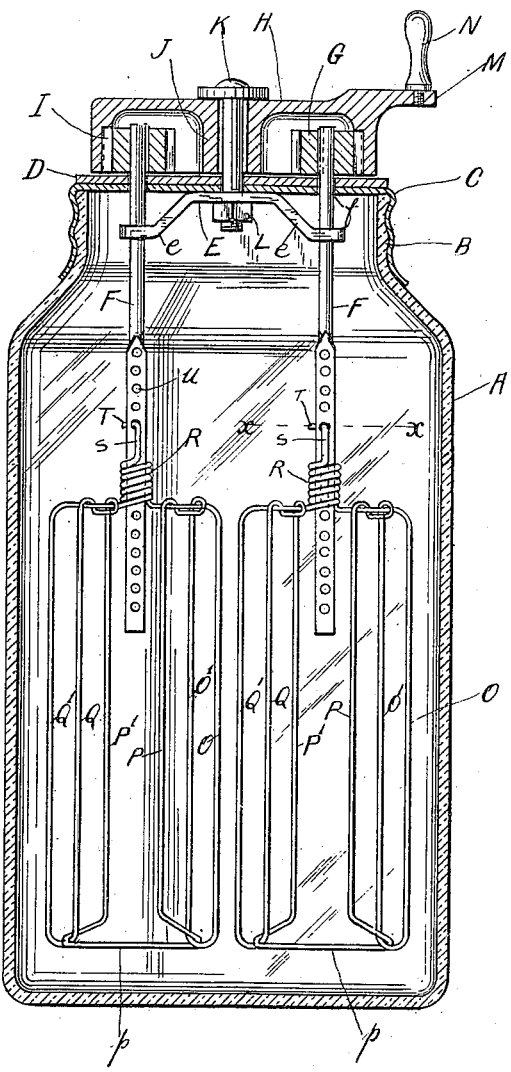

ARTHUR H. OTTEN, OF MILWAUKEE, WISCONSIN, ASSIGNOR OF ONE-HALF TO OTTO R. SCHULZ, OF MILWAUKEE, WISCONSIN.

EGG-BEATER.

964,306. Specification of Letters Patent. Patented July 12, 1910.

Application filed September 7, 1909. Serial No. 516,463.

*To all whom it may concern:*

Be it known that I, ARTHUR H. OTTEN, a citizen of the United States, residing at Milwaukee, county of Milwaukee, and State of Wisconsin, have invented new and useful Improvements in Egg-Beaters, of which the following is a specification.

My invention relates to improvements in egg beaters of that class in which the beaters are attached to a cover, adapted to be applied to any ordinary fruit jar having a neck of standard size and threaded exterior.

The object of this invention is to provide a form of construction which will be inexpensive, and which can be readily adapted to fit either quart or pint jars. Also to provide a form of construction in which the rotating beaters will be adequately supported against lateral vibration when in use.

In the following description reference is had to the accompanying drawings in which, Figure 1 is a view of my improved egg beater as applied to a Mason fruit jar. Fig. 2 is a top view of one of the beater frames, showing its supporting rod and stem in cross section.

Like parts are identified by the same reference characters throughout the several views.

The jar A may be of any ordinary type, provided with a neck B having a screw threaded exterior surface. A metallic cap C is adapted to be secured to the neck of the jar in the same manner as any ordinary jar cover. The cap C, however, is provided with a reinforcing plate D on its upper surface and a brace plate E is applied to the central portion of its lower surface with arms *e* offset downwardly and provided with apertures through which the rods F extend. These rods project upwardly through suitable apertures *f* in the cap C and reinforcing plate D, and are rigidly connected, above the cap, with pinions G. A driving member H is adapted to fit over these pinions. It is provided with teeth I, adapted to mesh with both pinions, the pinions being received in an annular space between the internal gear teeth and a central hub member J, which bears upon the reinforcing plate D. A central bolt K extends downwardly through the hub member and through suitable apertures in the reinforcing plate D, cap C and brace plate E, a nut L being applied to the lower end of the bolt, whereby these parts are secured together. The member H is provided with an outwardly projecting arm M, having a handle N, whereby it may be rotated and its motion communicated to rotate the rods F.

Each of the rods F is provided with an adjustable beater composed of a single piece of wire, which is bent as illustrated in the drawing to form a series of beater rods O and O', P and P', Q and Q', one end of the wire being then coiled to form a flattened tubular stem R, the extremity of the wire extending above the stem to form a shank S and a hook T, the latter engaging in any one of suitable apertures U formed in the rod F.

It will be observed that the rods O—O' and Q—Q' form loops at their lower end, and the rods P—P' are also looped in dovetail form at their ends and interlaced with the loops of the other rods, forming a connecting link *p* between them, whereby the several rods are mutually supported at the bottom of the beater.

With the described construction it will be obvious that by releasing the hooked portion F from any given aperture U in one of the rods F, it may be shifted to any other aperture in such rod, thus raising or lowering the beater along the rod so that it may be supported at any desired height in the jar, or adapted to the requirements of jars of different lengths. The beater may therefore be applied to either a pint or quart jar or to either a quart or two quart jar.

The coil R is flattened and the lower ends of the rods F are correspondingly flattened so that the rods are not permitted to rotate in the coil. This relieves the hooks F from torsional strains to which they would otherwise be subjected.

Having thus described my invention what I claim as new and desire to secure by Letters Patent, is,

1. In a beater, the combination of a cap adapted to fit an ordinary fruit jar, a pair of rods extending through the cap, beater frames adjustably secured to the lower ends of said rods, pinions rigidly secured to the upper ends of said rods and an actuating member centrally secured to the cap and provided with internal gear teeth meshing with said pinions, said rods having their lower ends flattened and each of said beater frames being formed of wire having one end provided with a flattened coil adapted to receive the flattened portion of said rod, whereby the rotation of the rods will be communicated to the beater frames through said coils, together with braces connected with said cap and arranged to support the rods at points below the cap.

2. In a beater, the combination of a cap adapted to fit an ordinary fruit jar, a pair of rods extending through the cap, beater frames adjustably secured to the lower ends of said rods, pinions rigidly secured to the upper ends of said rods, and an actuating member centrally secured to the cap and provided with internal gear teeth meshing with said pinions, each of said beater frames being formed of wire, having one end provided with a flattened coil and a hooked extremity adapted to engage in suitable apertures in the rod to which the frame is applied, said rods being flattened and provided with hook receiving apertures in positions to permit an adjustment of the beater frame in correspondence with the requirements of jars of different sizes.

In testimony whereof I affix my signature in the presence of two witnesses.

ARTHUR H. OTTEN.

Witnesses:
L. C. WHEELER,
O. R. ERWIN.